Figure 1:
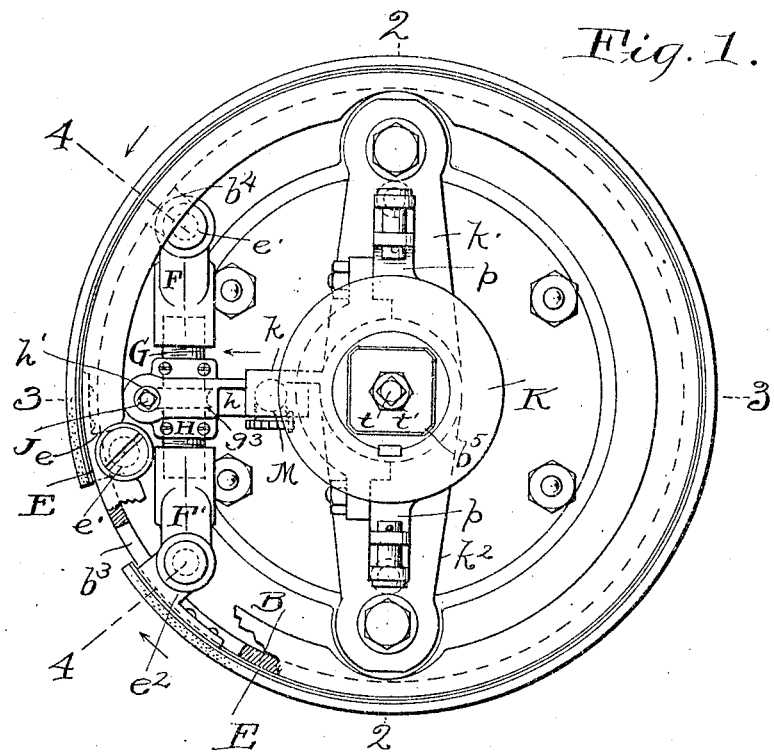

C. SCHMIDT.
CLUTCH.
APPLICATION FILED JAN. 15, 1906.

926,141.

Patented June 29, 1909.
2 SHEETS—SHEET 1.

Witnesses,
E. B. Gilchrist
H. R. Sullivan

Inventor
Charles Schmidt
By Thurston Bates & Woodward
attorneys

UNITED STATES PATENT OFFICE.

CHARLES SCHMIDT, OF CLEVELAND, OHIO, ASSIGNOR TO THE PEERLESS MOTOR CAR COMPANY, OF CLEVELAND, OHIO, A CORPORATION OF WEST VIRGINIA.

CLUTCH.

No. 926,141.     Specification of Letters Patent.     Patented June 29, 1909.

Application filed January 15, 1906. Serial No. 296,104.

*To all whom it may concern:*

Be it known that I, CHARLES SCHMIDT, a citizen of the Republic of France, residing at Cleveland, in the county of Cuyahoga and State of Ohio, have invented a certain new and useful Improvement in Clutches, of which the following is a full, clear, and exact description, reference being had to the accompanying drawings.

The invention belongs to the type of clutches which employ an expansible split ring; and the clutch shown in the drawing in which the invention is embodied, is designed especially for use on automobiles for connecting the engine shaft with the transmission mechanism.

Figure 4:
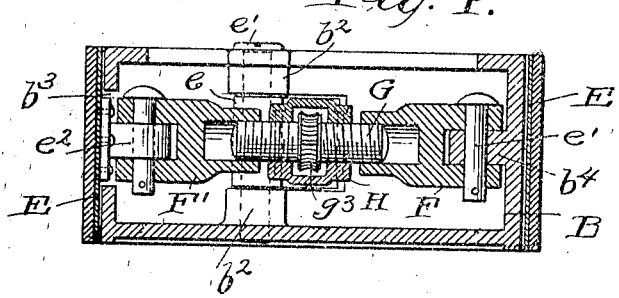
Figure 2:
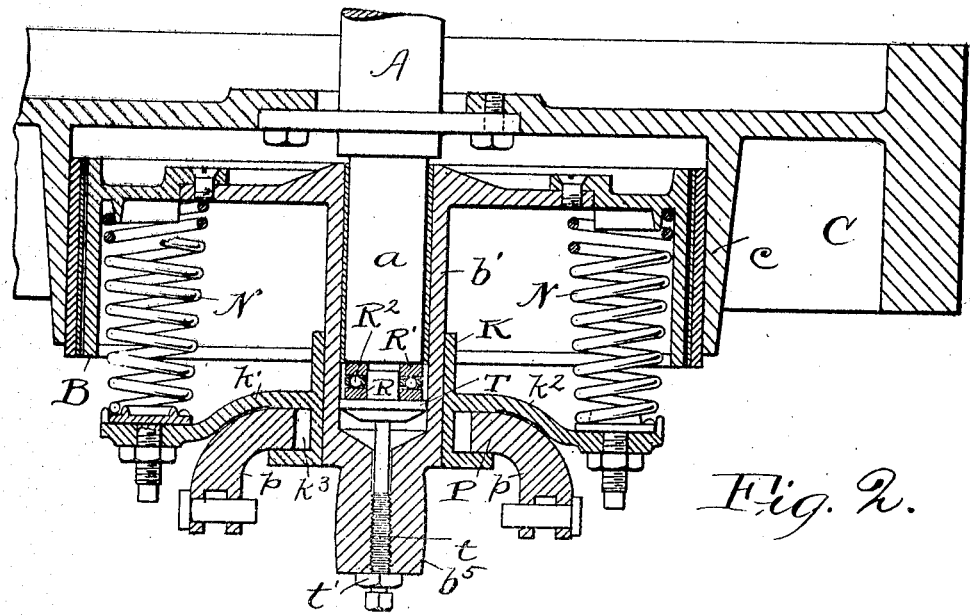
Figure 3:
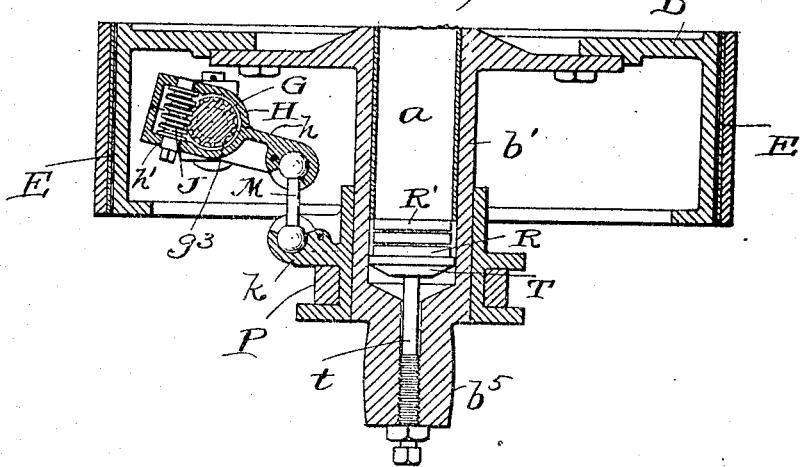

In the drawings, Figure 1 is an end view of the clutch mechanism, omitting the cylindrical flange with which the split ring is to engage. Fig. 2 is a diametrical section of the clutch in the plane indicated by line 2—2 of Fig. 1, said cylindrical flange and the shaft which carries it being shown. Fig. 3 is a diametrical section on the plane indicated by line 3—3 of Fig. 1. Fig. 4 is a sectional view on line 4—4 of Fig. 1, through the edges of the drum which supports the split ring; also showing the connection between the drum and the end of the ring.

Referring to the parts by letters, A represents the driving shaft, and C a fly wheel attached thereto having the cylindrical flange $c$.

B represents the clutch drum which is rotatably mounted in axial alinement with said shaft and within said cylindrical flange,—which drum is intended to have a non-rotative connection with the power transmitting mechanism. In the construction shown the drum is rotatively mounted upon the projecting end $a$ of the engine shaft. Embracing this drum and lying between it and said cylindrical flange is the split ring E. This ring is fixed at one end to the drum. As shown this end is provided with a lug $e$ which extends through and is substantially fitted to a slot in the drum, and this lug is attached to the drum by a screw $e'$, which engages with lug $b^2$ on the inner periphery of said drum. A similar bracket lug $e^2$ is secured to the other end of said ring, and projects through an elongated slot $b^3$ in the drum, in which slot it has a considerable circumferential movement. The means employed for expanding this ring so as to cause it to impinge against the annular flange $c$ is the following, namely: A screw-threaded sleeve F' is pivoted at one end to the inward prolongation of said lug $e^2$,—the pivot being substantially parallel with the axis of the clutch. A similar screw threaded sleeve F is pivoted on a parallel axis to a lug $b^4$, which is fixed to the drum. The threaded socket in one of these sleeves has a right handed thread, and that in the other sleeve has a left handed thread.

G represents an expanding screw which has right handed threads at one end and left handed threads at the other end, which threads respectively screw into the threaded sockets of the two sleeves F and F'. Between these two threaded portions the screw is provided with a worm wheel $g^3$. Embracing this worm wheel and rotatable upon the screw G is a casing H having an arm $h$ projecting inward toward the axis of the clutch. Mounted in the casing is a worm J in mesh with said worm wheel. The end of the worm projects out through a hole $h'$ in the casing, and is squared or slotted for the engagement of a suitable tool by means of which it can be turned and the relative position of the screw and its operating arm adjusted.

Upon the hub $b'$ of the drum B is a sliding sleeve K having three laterally projecting arms, to wit, the arm $k$, which is connected by means of a link M with the operating arm $h$; and two arms $k'$, $k^2$. By moving this sleeve inward upon said hub the screw G will be caused to turn in that direction which will separate the two sleeves F, F', and thereby expand the ring E and force it into engagement with the flange $c$. By moving this sleeve in the contrary direction the ring will be contracted upon the drum and withdrawn from engagement with said flange. The sleeve is moved in the last named direction by means of springs N which are compressed between the head of the drum and the two arms $k'$ $k^2$ respectively, said spring acting to expand and thereby to move said sleeve.

Any suitable mechanism may be employed to move the sleeve in opposition to the spring. In the construction shown a ring P is loosely fitted into an annular groove $k^3$ in said sleeve, which ring has arms $p$, $p$, whereby to attach mechanism for moving said ring and thereby said sleeve.

Within the hub $b'$ of the drum is an adjustable thrust bearing for the end of the engine shaft, this bearing being provided to minimize the friction incident to moving the shifting sleeve in the direction to expand the clutch ring. In the bore of said hub there are two hardened steel disks R, R' having in their proximate faces annular grooves forming race ways for the balls $R^2$. The ring R' lies against the end of the engine shaft. The ring R lies against a disk T slidable in the bore of said hub, which disk is secured to the end of a screw $t$, which screws axially through the closed end of a stem $b^5$ of said hub,—this screw $t$ being provided with a lock nut $t'$. The balls may be in the embrace of a holder $R^3$.

I claim:

1. In a friction clutch, the combination of a split ring and its support, with a rotary oscillating device for changing the diameter of said ring, a worm wheel secured to said oscillating device, an operating lever rotatably mounted on said device, a worm mounted on said lever in engagement with said worm wheel for adjustably connecting said oscillating device and lever, and mechanism for operating said lever.

2. In a friction clutch, the combination of a clutch drum, a split ring embracing the same and having one end secured to the drum, a lug secured to the other end of said ring and passing through an elongated guide slot in the drum, a threaded sleeve pivotally connected with the inner projecting part of said lug, another threaded sleeve pivotally connected with said drum,—the threads in said two sleeves being respectively right handed and left handed, with a screw having oppositely threaded ends engaging in said sleeves, and means for turning said screw in either direction.

3. In a friction clutch, the combination of a clutch drum, a split ring embracing the same and having one end secured to said drum, a lug secured to the other end of said ring and passing through an elongated slot in said drum, a threaded sleeve pivotally connected with the inner projecting part of said lug, another threaded sleeve pivotally connected with said drum,—the threads in said two sleeves being respectively right handed and left handed,—with a screw having oppositely threaded ends engaging in said sleeves, a worm wheel secured to the intermediate part of said screw, a lever rotatably mounted upon said screw and having a casing portion which embraces said worm wheel, a worm mounted in said casing portion in engagement with said worm wheel, and mechanism for operating said lever.

4. In a friction clutch, the combination of a drum, a split ring embracing the same, a sleeve slidable axially with respect to said drum, mechanism operated by said sleeve for expanding and contracting said split ring, and arms secured to said sleeve, and expanding coil springs compressed between said arms and the drum head and acting to move the sleeve in that direction which will cause the unclutching movement of the ring-operating mechanism.

In testimony whereof, I hereunto affix my signature in the presence of two witnesses.

CHARLES SCHMIDT.

Witnesses:
E. B. GILCHRIST,
E. L. THURSTON.